United States Patent

[11] 3,524,372

[72] Inventor Norman P. Albrecht
2430 N. Arona St., St. Paul, Minnesota
55113
[21] Appl. No. 419,747
[22] Filed Dec. 21, 1964
[45] Patented Aug. 18, 1970

[54] APPARATUS FOR SUPPORTING FILM WHILE BEING EDGE PUNCHED
3 Claims, 15 Drawing Figs.

[52] U.S. Cl. .......... 83/451, 29/433, 83/36, 83/522, 96/30
[51] Int. Cl. .......... B26d 7/02, B26d 7/28
[50] Field of Search .......... 96/30; 29/433; 83/451, 522, 36, 29

[56] References Cited
UNITED STATES PATENTS

| | | | |
|---|---|---|---|
| 2,320,205 | 5/1943 | Wales | 83/522X |
| 3,122,044 | 2/1964 | Grosh | 83/522UX |
| 3,207,021 | 9/1965 | Bradley | 83/522 |

*Primary Examiner*— Andrew R. Juhasz
*Attorney*— Robert M. Dunning

ABSTRACT: An edge punching apparatus for supporting and holding film on which chromes are mounted so that the film may be edge punched. The supporting table of the apparatus is provided with apertures communicating with a vacuum chamber for holding the film against the surface of the table. Gauge marks are provided on the upper surface of the table to facilitate centering the particular size film to be punched.

INVENTOR
NORMAN P. ALBRECHT

BY [signature]
ATTORNEY

INVENTOR
NORMAN P. ALBRECHT
BY [signature]
ATTORNEY

INVENTOR

NORMAN P. ALBRECHT

BY

ATTORNEY

APPARATUS FOR SUPPORTING FILM WHILE BEING EDGE PUNCHED

This invention relates to a method and apparatus for forming printing plates and the photographic film used in the formation of these plates.

Considerable time and effort is experienced in the formation of color plates used in the printing of colored illustrations. Perhaps the biggest difficulty lies in perfectly matching the various films during this operation. This is particularly true in commercial operations where a number of illustrations are simultaneously photographed and where separate plates are to be made of the various illustrations. As an example, in preparing a booklet or catalog including a great number of colored illustrations, it is common practice to photograph a number of these colored transparencies, commonly called "chromes", forming a color separation negative for each color, and then to photograph the individual transparencies through a screen of desired mesh to provide individual screen positives for each color from which halftone plates are made.

While this process in itself must be a careful and exact one, much greater complications arise after the screen positives have been formed and where the individual illustrations must be cut from the larger transparencies, and each screen positive of each individual illustration must be matched. This operation has normally been done by manually aligning the transparencies one above the other by visual observation until the transparencies exactly match. This operation may be simplified to some extent by providing gauge marks adjoining each illustration before the process is started. However, even in this case, the matching of the superimposed screen transparencies is usually dependent upon the eyesight of the operator, and in any event requires considerable time and effort.

I have found that a very considerable amount of time can be saved, and most of the opportunity for human error can be eliminated through the use of certain apparatus and by following a predetermined method of procedure. From the beginning of the operation to the end thereof, the film is held in perfect registry whether the illustrations to be processed are the full size of the film or whether a series of illustrations are being simultaneously processed. This is true regardless of the number of color plates to be made. For the purpose of illustration, the following description will mention plates being described for a four-color printing operation. As will be obvious from the description, the process will similarly apply to a two or three-color printing process, and could apply equally well to a printing process involving five or more colors.

A feature of the present invention resides in the fact that throughout the process, the proper position of the film may be maintained, even though the film itself may not be exactly square. The squareness of the edges of the film is not depended upon for maintaining the transparencies in proper relation.

These and other objects and novel features of the present invention will be more clearly and fully set forth in the following specification and claims.

In the drawings forming a part of the specification:

Figures 1, 2, 3, 4:
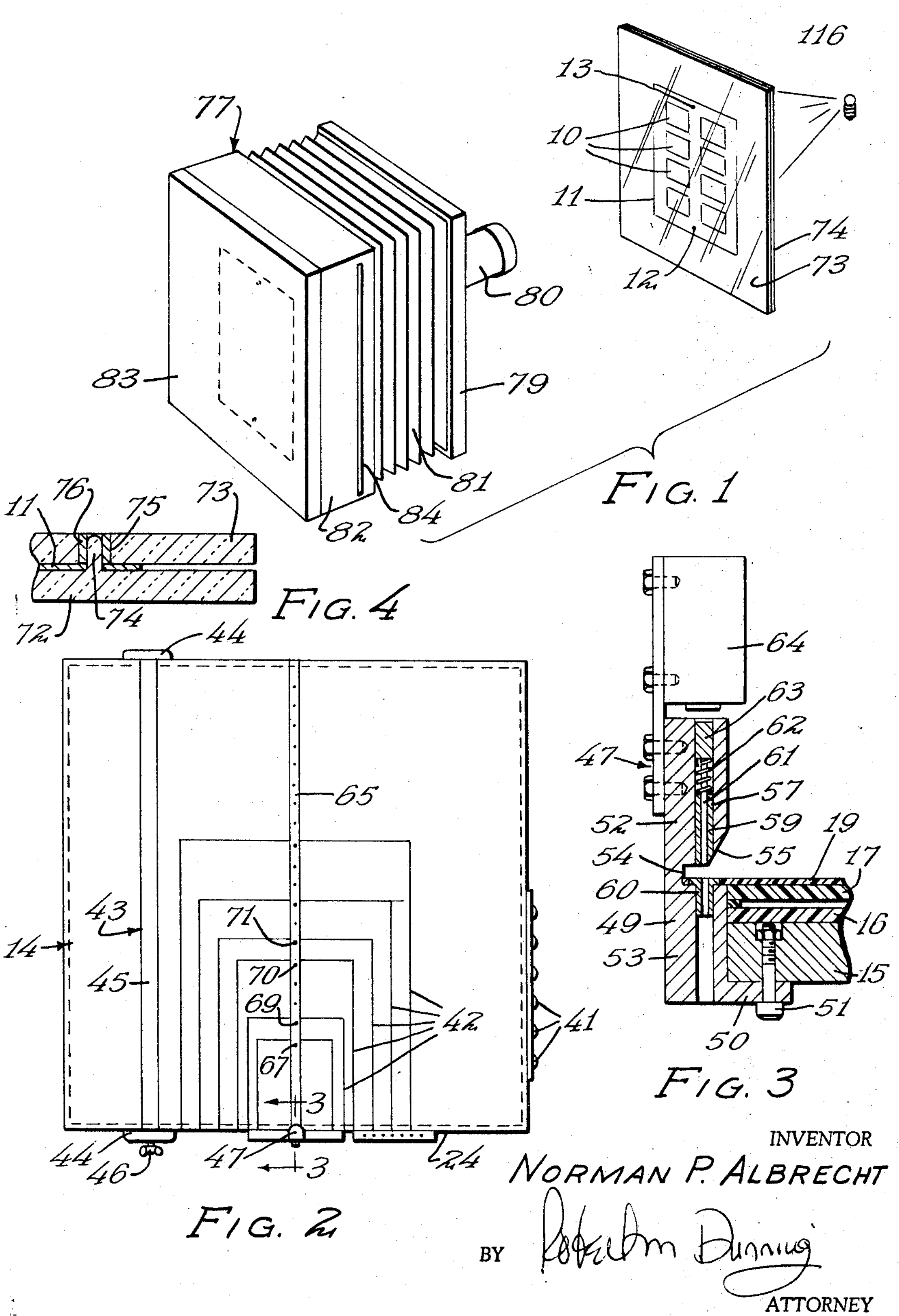
FIGURE 1 is a diagrammatic perspective view showing a camera, a mounting plate supporting transparencies to be filmed, or transparent color chromes of the illustrations and a source of light.
FIGURE 2 is a plan view of a table on which the film may be placed for the edge punching operation.
FIGURE 3 is a vertical sectional view through an edge punch used to punch apertures in the edges of film, the position of the section being indicated by the line 3-3 of FIGURE 2.
FIGURE 4 is an enlarged sectional detail showing the plate between which the film is sandwiched during the photographing operation, and showing the manner in which the film is properly located relative to the camera.

For the purpose of illustration, the starting illustrations are transparencies commonly known as "chromes" of the type commonly used in chromolithography. The chromes are color transparencies formed by filming the original art work or the original object to be illustrated. These may be of various sizes and shapes. In commercial production work, chromes of this type are usually mounted so that a series of chromes may be processed in unison, in the interests of economy. Obviously, if enlargement is involved, all of the chromes will be enlarged to the same degree. As will also be obvious, all of the finished plates must be of the same screen mesh. For the purpose of illustration, FIGURE 1 illustrates a series of eight chromes 10 mounted upon a transparent film 11 which may be, for example, of twelve by sixteen size. For the purpose of description, the chromes are shown as held in a vertical position in front of the camera. Obviously, a camera may be suspended above the object to be viewed.

Figures 9, 10, 11:
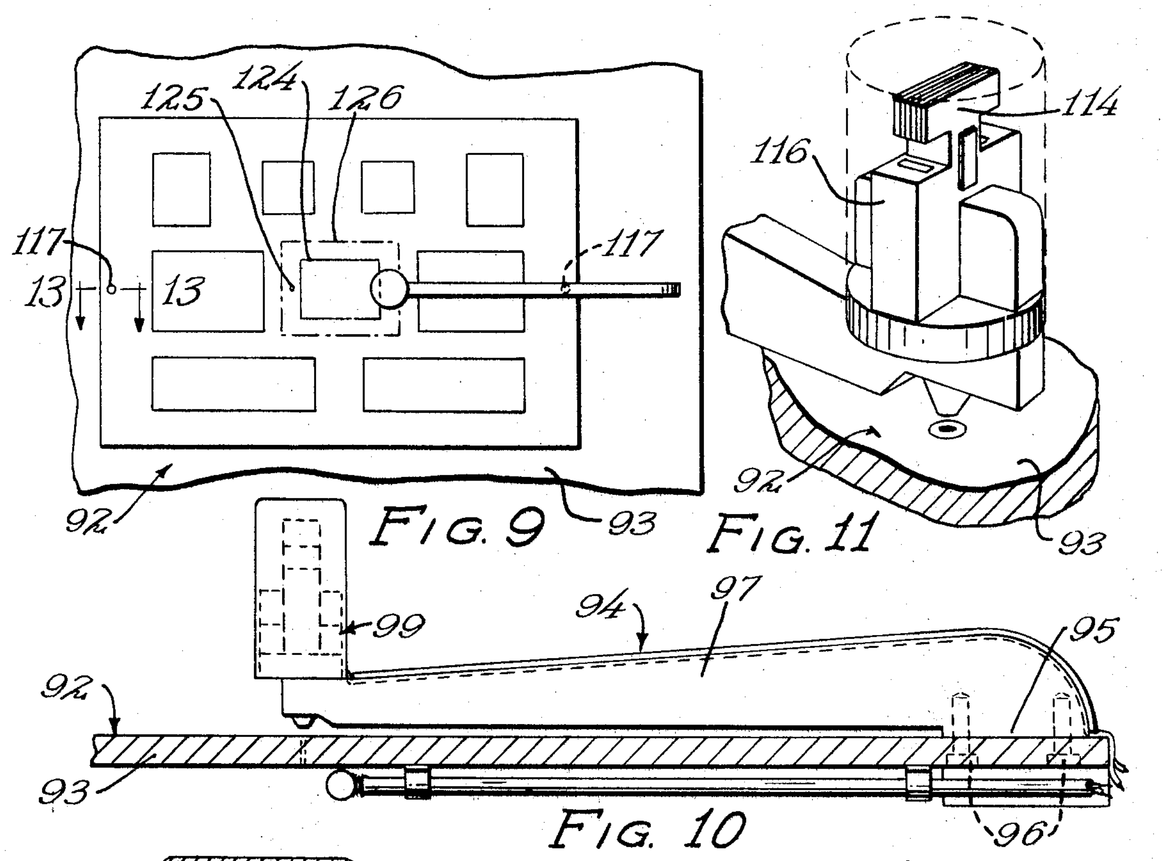
FIGURE 9 is a plan view of a long throat punching table by means of which apertures may be punched at any point throughout the area of the film.
FIGURE 10 is a vertical section through a portion of the table shown in FIGURE 9 showing a long throat punch mounted thereupon.
FIGURE 11 is a perspective view of the punch head of the long throat punch.
Figure 12:
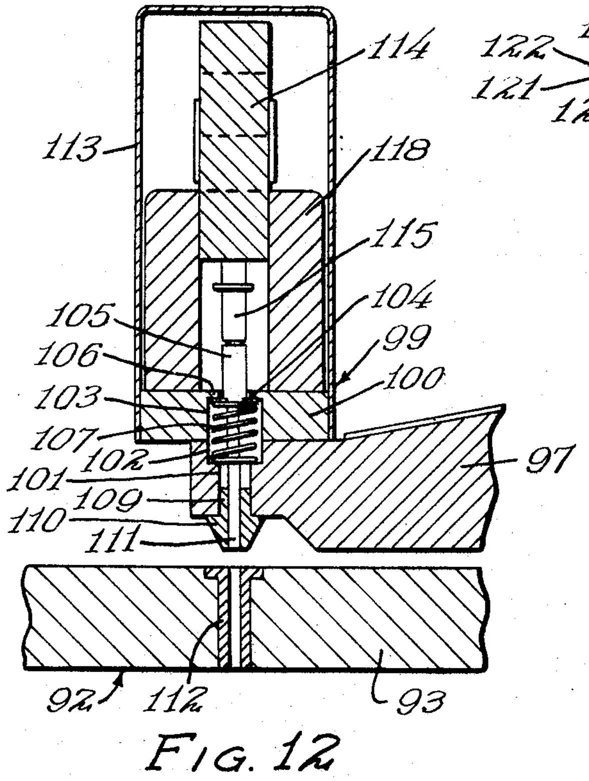
FIGURE 12 is a vertical sectional view through the punch head shown in FIGURE 11.

As a first step of the procedure, the transparent film 11 supporting the chromes is punched to provide two apertures 12 and 13 usually along opposite edges of the film 10 and outside the area of the chromes. It should be mentioned that the chromes 10 are in all cases spaced apart and spaced slightly from the marginal edge of the film 11. FIGURE 1 shows the chromes 10 as being of uniform size, but it is obvious that they need not be bigger. FIGURE 9 indicates a condition in which the chromes have been of different size and shape. It should also be mentioned that the chromes need not be rectangular but may be cut to any desired outline shape.

Figures 5, 7, 8:
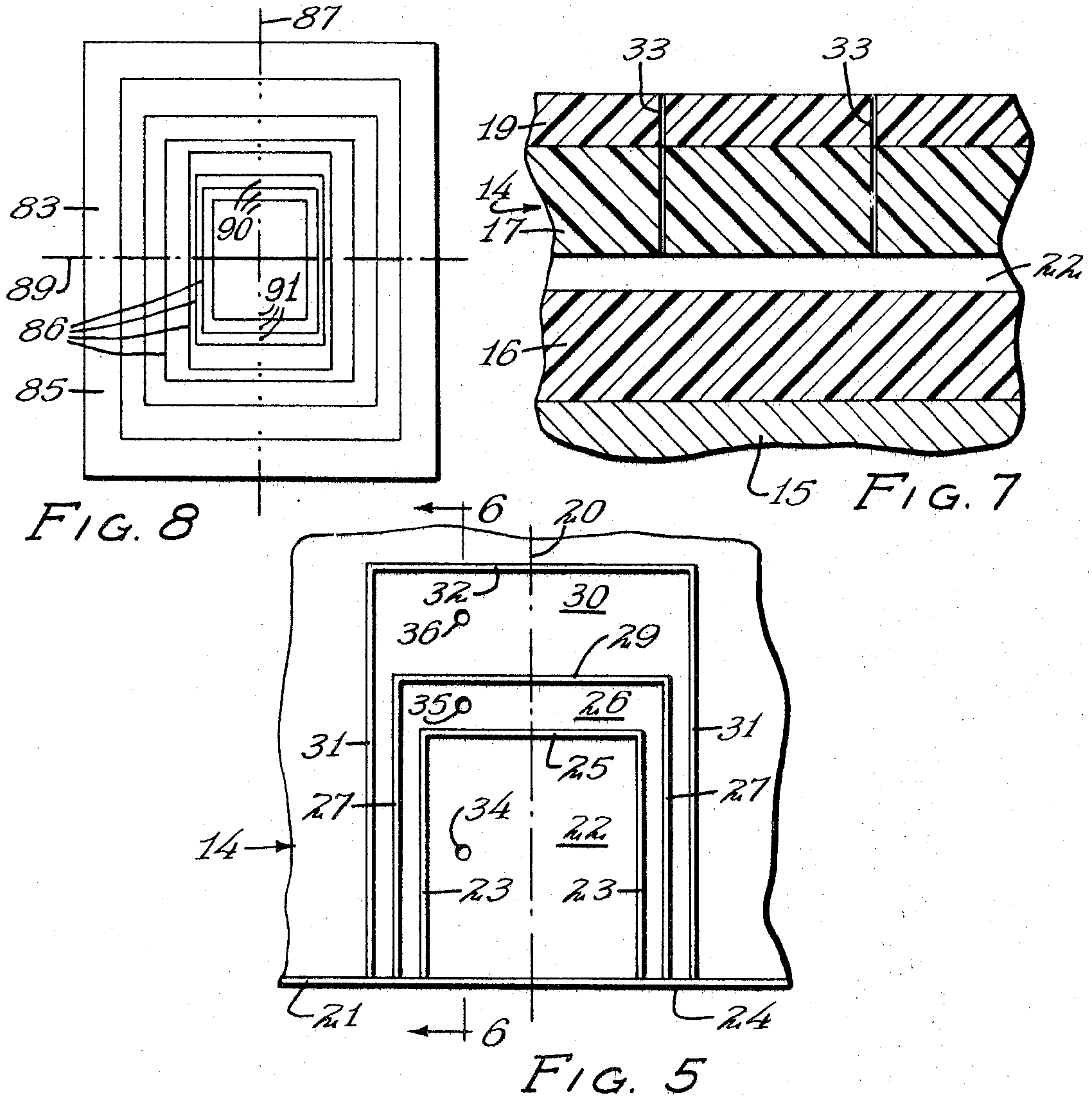
FIGURE 5 is an enlarged view of the section of the table illustrated in FIGURE 2.
FIGURE 7 is a greatly enlarged vertical section through a portion of the table showing a manner in which the films may be held in place by vacuum.
FIGURE 8 is a diagrammatic elevational view of the film mounting plate at the rear of the camera.
Figure 6:
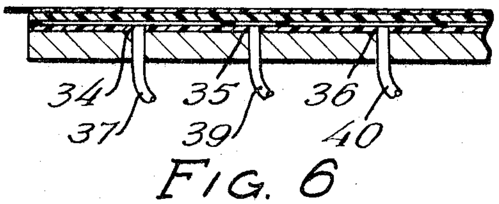
FIGURE 6 is a vertical sectional view through a portion of the table shown in FIGURE 3, the position of the section being indicated by the line 6-6 of FIGURE 3.

The edge punching operation may be effectively performed on a table illustrated in FIGURES 2-7 of the drawings. The table 14 is shown of rectangular form, may be built up as indicated in FIGURES 3 and 7 of the drawings to include a flat wooden base 15, preferably having a flat air-impervious panel 16 of plastic overlying the same. A second plastic plate 17 is held in spaced relation to the plate 16 by spacers which will be described more in detail. A top plastic plate 19 overlies the plate 17 in surface contact therewith.

FIGURE 5 illustrates a portion of the table with the top plates 17 and 19 removed to show a portion of the spacer structure. The spacers include strips of air impervious material such as plastic which support the panels 17 and 19 and divide the area between the plates 16 and 17 into a series of rectangular sections extending equally on opposite sides of the table center line which is indicated in general by the numeral 20. The spacers include peripheral spacer strips 21 which extend entirely about the periphery of the plates 16 and 17 to form an airtight enclosure between the plates. Within this enclosed area is a relatively small chamber 22 defined by a pair of spacer strips 23 spaced equally from the center line 20 and at right angles to the forward edge 24 of the table 14. The spacer strips 23 abut the front portion of the marginal spacer strip 21 and are connected at their opposite ends by a spacer strip 25. The spacer strips 23 and 24, when combined with the front marginal spacer strip 21 form a closed chamber 23 which may be, for example, eight inches wide and ten inches long or slightly below these dimensions.

A second rectangular area is formed by spacer strips which enclose the spacer strips defining the chamber 22. The chamber 26 is formed by a pair of parallel spacer strips 27 having their forward ends abutted against the front spacer strip 21 and having their rear ends connected by a spacer strip 29 parallel to the forward edge 24 of the table 14. The spacer strips 27 and 29, combined with the front spacer strip 21, thus form an airtight chamber enclosing the chamber 22 and being perhaps slightly less than ten inches wide and twelve inches long.

A somewhat larger airtight chamber 30 encloses the chambers 22 and 26. The chamber 30 is defined by parallel spacer strips 31 abutting the front spacer strip 21 and having their other ends connected by a spacer strip 32 parallel to the front edge 24 of the table 14. The chamber 30 may be, for example, slightly less than twelve inches wide and sixteen inches long. In a similar manner, additional spacer strips can be provided to enclose the smaller compartments and to define an area of twenty by twenty-four inches, twenty-four by thirty inches, and the like. The sizes of the various chambers is preferably slightly less than standard available film sizes.

Small diameter apertures 33 extend through the plates 17 and 19 to form communication between the upper surface of the table and the interior of the various chambers between the plates 16 and 17. In actual practice, the plates 17 and 19 may comprise merely a single plate, the double plate arrangement being used for the purpose of convenience. Suction ports, 34, 35, and 36 are provided in the chambers 22, 26, and 30, respectively, so that air may be evacuated from these chambers. To accomplish this result, suction connections 37, 39, and 40 may be connected to the individual ports 34, 35, and 36, and these suction connections may be selectively connected to a source of partial vacuum.

The purpose of this arrangement is to provide a means of holding a film in surface contact with the top of the table during the punching operation. When a small film, such as an eight by ten film is to be punched, only the smallest compartment 22 which is of slightly smaller dimensions than this film is evacuated. The film is held against the surface by atmospheric pressure acting in opposed relation to the vacuum passages 33. If a somewhat larger film such as a ten by twelve film is to be used, air is evacuated both from the chamber 26 and the inner chamber 22. If a twelve by sixteen film is to be used, air is also evacuated from the chamber 30 as well as the two inner chambers. In a similar manner, vacuum chambers are formed which are of a size approximately equal to larger film sizes such as twenty by twenty-four or twenty-four by thirty. If desired, a film equal in size to the entire table may be similarly held in place. In actual practice, the vacuum is controlled by a series of electrically operated valves controlled by pushbuttons 41 and each connected in circuit so that when air is evacuated from any chamber, it will also be evacuated by any of the smaller enclosed air chambers. However, as the result could be accomplished in various ways, the structure has not been shown in detail in the drawings.

The upper surface of the table 14 is preferably lined as indicated at 42 to define the commercially available film sizes, the areas defined by each of the gauge lines 42 being symmetrical on opposite sides of the table center line and all of the areas having an edge defined by the forward edge of the table. An adjustable guide member 43 is supported on the table surface extending from the front to the rear of the table, and having guides 44 connected to the ends of the guide strips 45 to hold the guide strips 45 at right angles to the front and rear edges of the table. The guide 43 may be held in place by a set screw 46 or other suitable means. This guide 43 may be adjusted to extend along the edge of any of the gauge marks 42 to simplify the operation of positioning a film of predetermined size upon the table. As will be later seen, this gauge is of importance as the table 14 is normally located in a dark room so that unexposed film may also be edge punched in a similar manner.

A punch which is indicated in general by the numeral 47 is supported upon the forward edge 24 of the table to punch an aperture in the edge of a film resting upon the table at a predetermined distance from the edge of the film. The punch 47 includes a body portion 49 having at its lower end a right angular flange 50 designed to underlie the base 15 of the table 14 and to be secured thereto by any suitable means such as the bolts 51. The body 49 is divided into an upper portion 52 and a lower portion 53 by a notch 54, the upper edge of which is angled as indicated at 55 to simplify the insertion of the edge of the film into the notch. The body 49 is of sufficient length to act as a guide for the edge of the film engaged in the notch 54. A cylindrical bore 57 extends vertically through the body 52 intersecting the notch 54 and having its axis in a vertical plane through the center line of the table 14 and having its axis spaced from the base of the notch 54 a distance sufficient so that hole punched, when engaged, will not readily tear out to the edge of the film. A bushing 59 is provided in the lower portion of the part of the bore 57 above the notch 54, and a female punching die 60 is supported in the portion of the barrel or bore 57 below the notch 54. A punch rod 61 is slidably supported in the bushing 59 and the lower end of the punching rod 61 is normally held above the notch 54 by a spring 62 interposed between the upper edge of the bushing 59 and the enlarged diameter upper end 63 of the punching rod 61. The punch is of proper length to extend through the film resting upon the table surface and engage in the notch 54 and into the female die 60. The punch rod 61 is preferably lowered through its punching position by a solenoid 64 supported above the upper end 63 of the punch which acts as a solenoid armature.

A strip 65, preferably of metal, extends from front to rear across the table 14 along the center line. The strip 65 is provided with a series of sockets therein, each socket being spaced from the axis of the punch 61 a distance substantially corresponding with the length of each size film less twice the distance between the axis of the punch rod 61 and the base of the notch 54. The purpose of this arrangement is to provide a means of punching two holes in opposite edges of a film approximately equally spaced from the film edge and accurately spaced apart. In explanation, after a hole has been punched in one edge of the sheet, a pin may be inserted through the first punched hole and inserted into a corresponding aperture in the strip or bar 65 and a second hole may be punched in the opposite film edge which is accurately spaced from the first punched aperture. Thus the sockets 67, 69, 70 and 71 are all located a predetermined distance inwardly of the gauge lines 42.

FIGURE 4 of the drawings diagrammatically illustrates the manner in which the mounting film 11 or any of the other individual films to be formed may be mounted during the photographic process. The mounting sheet 11 is shown between a pair of transparent plates 72 and 73. The plate 72 includes a pair of projecting pins 74 which are spaced apart a distance equal to the space between the holes 12 and 13 punched in opposite edges of the mounting film 11. The plate 73 is provided with a pair of sockets 75 which are axially spaced equally to the pins 74 and which normally include a bushing 76 to snugly accommodate the corresponding pin 74. Means are provided to support the plates 72 and 73 in fixed relation to the camera, and the pins 74 provide means for properly locating the mounting film 11 or other film relative to the plates 72 and 73. Usually a set of plates 72, 73 is provided for use with each standard size of film.

A means is also provided for properly locating the unexposed film within the camera which is indicated in general in FIGURE 1 by the numeral 77. While the camera may be of any suitable design, it normally includes a front plate 79 which supports the lens 80 and which is connected by an expandable bellows 81 to the rear camera section 82. The rear plate 83 is removably connected to the camera and usually supports the film to be exposed. The rear section 82 also includes a suitable slot 84 through which the screen may be inserted when the halftone transparencies are being made.

The rear cover plate 83 is constructed in such a manner that a film of any standard size may be supported thereupon in fixed relation thereto. The inner surface 85 of the cover plate 83 is provided with a series of rectangular gauge marks 86 defining areas corresponding to the standard film sizes which are symmetrically arranged with respect to the longitudinal center line 87 and a transverse center line 89. The surface 85 is also provided with a series of spaced sockets 90 and 91 along the longitudinal center line 87 and spaced apart an equal distance from the transverse center line 87 to be located inwardly of the gauge line 87 defining each standard size of film. In other words, the spacing between the innermost sockets 90 and 91 are spaced apart a distance equal to the spacing between the axis of the punch rod 61 and the socket 67 in the table 14. The next closest sockets 90 and 91 are spaced apart a distance equal to the distance between the punch axis and the socket 69 of the board 14. As a result, a punched film may be inserted in the camera mounted on the camera back 83 and centered with respect to the camera lens. In usual practice, pins are inserted in the proper apertures to accommodate an unexposed film of predetermined size to facilitate the attachment of the unexposed film to the camera end in the dark room.

The other portion of the apparatus used in conjunction with the present method is illustrated in FIGURES 9-12 of the drawings. The apparatus includes a table which is indicated in general by the numeral 92, only the table top 93 of which is illustrated in the drawings to simplify the illustration. The table top body 93 is of proper dimensions to accommodate the largest films to be handled. A long throat punch 94 is secured to the table top 93 near an edge thereof. The punch 94 includes a base portion 95 which is secured to the table top 93 by cap screws 96 or other suitable means. An elongated arm 97 extends from the base portion 95 in a general direction toward the center of the table top 93. The arm 97 is of sufficient length so that the punching head 99 on the end of the arm 97 may reach any point of the largest film size to be used. In other words, the length of the arm 97 must be at least one-half the width of the largest film.

The punch head 99 includes a bottom disk 100 secured to the upper surface of the free end of the arm 97, a vertical cylindrical bore 101 is provided in the undersurface of the free end of the arm 97 and communicates with a larger diameter socket 102 in the upper surface of the arm end. The socket 102 is in registry with a similar socket 103 in the disk 100, the socket 103 communicating with the upper surface of the disk 100 by means of a smaller diameter bore 104. A punch 105 is slidable through the bore 104 and is provided with a shoulder 106 thereupon such as a snap ring or the like. A spring 107 extends from the bottom of the socket 102 to the shoulder 106 to normally urge the punch 105 upwardly. A bushing 109 having a frusto-conical end 110 is provided in the lower end of the bore 101 and slidably supports the lower end 111 of the punch 105 which is of reduced diameter.

A female punching die 112 is provided in the table top 93 in alignment with the punch end 111. When the punch 105 is lowered, a hole is punched in a film located between the lowered end of the bushing 110 and the female die 112.

A solenoid 118 is enclosed within a cylindrical open bottom enclosure 113, the solenoid including a generally T-shaped armature 114 provided at its lower end with a plunger rod 115 axially engaging the upper end of the punch 105. Upon energization, the T-shaped armature 114 is drawn against the upper end of the armature body 116 by magnetic force to force the punch through the film. The punch is retracted by the spring 107.

Having described the apparatus which may be used to carry out the method, the method followed is substantially as follows: The chromes 10 are mounted upon the transparent film which is of a standard film size. If desired, the side guide 43 may be adjusted over the surface of the table 14 until an edge of the guide is in registry with an edge of one of the gauge marks 42 on the table 14 which represent a film of that size. The end of the film 11 is inserted in the notch 54 of the punch 47 while an adjoining edge of the film 11 is against the side guide 43. Vacuum is connected to the vacuum chambers beneath the area covered by the film 11. This draws the film firmly against the top of the table 14 and holds it in place during each punching operation. The hole 12 is then punched.

The other end of the film is then inserted into the punch notch 54, and a pin is inserted into one of the sockets such as 67, 69, 70 or 71 depending upon the size of the film 11. If preferred, the pin may be inserted into the socket in the table, and the film aperture 12 may be threaded over the pin. Due to the fact that the size of the film 11 does not vary to any great extent, it is normally a very simple matter to insert a pin through the aperture 12 and into a proper socket in the strip 65 of table 14. The second hole 13 is then punched in properly spaced relation to the hole 12.

The film 11 is then applied to the transparent sheet 72 by threading the pins 74 through the apertures 12 and 13. The transparent plate 73 is then applied, the pin 74 engaging in the socket 75 of the transparent plate 73 to hold the two plates in contiguous relation.

If the transparencies of each color are to be the same size as the film 11, a contact frame could be used to form the transparencies for each color. The manner in which this could be accomplished will be obvious to one skilled in the art. However, as the use of the camera is not only more common but also more versatile and as the wider range of possibilities, the method will be specifically described in conjunction with the camera 77.

If, for example, the picture is to be printed in four colors, an unexposed film of the proper size is mounted upon the camera back 83. Pins are placed in the proper sockets 90 and 91 corresponding to the film to be exposed. In the dark room, an unexposed film is applied to the inner surface 85 of the camera back plate 83. This is done by adjusting the side guide 43 to the proper position for the unexposed film and then, after the lights have been extinguished, removing the unexposed film from its container and placing it upon the table 14 with one longitudinal edge against the side guide 43 and sliding the end of the unexposed film into the notch 54. The solenoid 64 is then actuated to punch a hole in the film. The film is then reversed in position so that the opposite end of the film is beneath the punch. In order to insure an accurate measurement between the openings, a pin is inserted through the first punch hole and into one of the sockets in the strip 65 of the table 14. This operation is relatively simple in view of the fact that when the reversed film is against the side guide 43 and in the notch 54, the first punched aperture will virtually correspond with one of the sockets such as 67, 69, 70, and 71. The solenoid 64 is again actuated, and the unexposed film is properly punched. The film is then mounted upon the pins in the surface 85 of the camera back plate 83, and this back plate is attached to the camera. The unexposed film used is either sensitive to a single color, or else color filters are employed so that only a single color is recorded upon the film.

This procedure is repeated four times, or until four films are produced, each of which is exposed to a single color. The individual films are developed in the customary manner.

In exposing the individual films, it is usual practice to provide a light source 116 on the opposite side of the plates 73 and 74 from the camera 77. The next step of the process is to provide transparencies in which each color is divided into individual dots of color, but reproducing each of the transparencies thus formed through a screen of the desired mesh.

Figure 13:
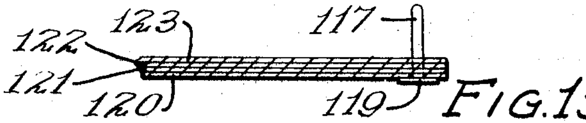
FIGURE 13 is a sectional view of a series of superimposed transparencies held in superimposed relation by a pin, the position of the section being indicated by the line 13-13 of FIGURE 9.
Figure 14:
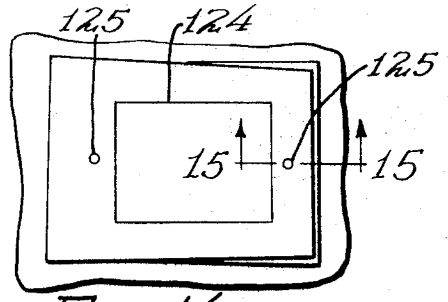
FIGURE 14 is a plan view of a series of portions cut from the superimposed larger transparencies and arranged in superimposed relation.
Figure 15:
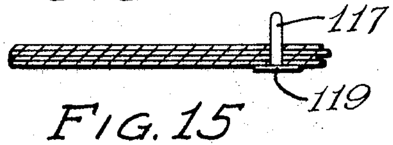
FIGURE 15 is a vertical sectional view through the superimposed transparencies, the position of the section being indicated by the line 15-15 of FIGURE 14.

To accomplish this result, each of the transparencies which have been formed are mounted one at a time between plates such as 73 and 74. A screen of the proper mesh is inserted into the camera through the slot 84. Unexposed film of a predetermined size is edge punched in the manner described and mounted upon the camera back 83, and four transparencies are formed, the transparencies each showing the areas of a predetermined color divided into minute dots. These screen transparencies are developed in the normal way. As a result of the process, the four screen color transparencies exactly coincide, and pins such as 117 may be inserted through the punched apertures in the four transparencies to hold them aligned. The pins 117 are preferably provided with heads 119 which permit the superimposed transparencies to be moved in unison. FIGURE 13 of the drawings discloses four such transparencies indicated at 120, 121, 122, and 123 in superimposed relation, each of the transparencies showing the areas on the chromes of a single color.

As previously stated, a number of chromes 10 are mounted on a single film 11, FIGURE 1 showing the chromes as being of identical size, while FIGURE 9 discloses superimposed transparencies which are the result of photographing chromes of different sizes. The next problem is to cut the individual color films of an individual chrome from the complete films. In the past this has been done by merely cutting around the representations of the individual chromes, placing these elements in superimposed relation, and securing them in proper relation by any suitable means. However, in the present method the superimposed exposed films 120 through 123, connected by the pins 117, are placed upon the table 93 beneath the arm 97 of the long throat punch 94. Let us say, for example, that the color print 124 at the center of the four films is to be removed. The superimposed films 120-123 are positioned so that the punch 105 is just outside the area to be produced. The solenoid 112 is then actuated, and two holes 125 are punched through the four superimposed films, preferably on opposite sides of the illustration 124. The films may then be cut either individually or in unison along the broken line 126 which is slightly beyond the border of the illustration 124 and outwardly of the punched holes 125. After the four films have been cut, they may be reassembled in superimposed relation by inserting additional pins 117 through the two punched holes. When the four film sections of the screen positives are assembled on the pins 125, they are in perfect alignment.

From the foregoing description, it will be seen that by following my method, screen transparencies may be purchased in such a manner that the individual color separation negatives may always be in perfect registry. By punching the unexposed film prior to insertion into the camera and mounting the film in proper position on the pins on the back of the camera, all of the individual color separation negatives will be maintained in perfect registry. As a result, at the completion of the operation of photographing the negatives through a screen, the four screen color positives produced may be mounted in perfect alignment by inserting pins through the punched apertures in each film. Furthermore, by providing a long throat punch capable of punching apertures in all of the screen positives simultaneously adjoining the individual pictures, the films may be individually cut about each of the individual pictures and reassembled in perfect registry. As a result, the necessity of registering the individual color films by eyesight is eliminated, producing plates of much greater accuracy with much less effort.

While the table 14 has been described as including sockets such as 67, 69, 70 and 71 to accommodate removable pins. If preferred, pins may be recessed in the sockets, and any pin raised by suitable means to extend into the first punched hole of the film. This arrangement might simplify the operation of punching the second hole when the operation is carried on in a dark room.

In accordance with the patent statutes, the principles of construction and operation of this improvement in apparatus for forming printing plates and photographic film have been described, and while and endeavor has been made to set forth the best embodiment thereof, it should be understood that changes may be made within the scope of the following claims without departing from the spirit of the invention.

I claim:

1. An edge punching device for edge punching rectangular sheets of flexible film, the device including:
- a table,
- an edge guide extending upwardly from said table and adapted to engage an edge of the rectangular film sheet,
- a punch supported on a vertical axis in inwardly spaced relation to said edge guide,
- a series of guide lines on said table which are symmetrical on either side of a center line extending through the punch axis and extending at right angles to said edge guide,
- said guide lines outlining rectangular areas, one side of which extends along said edge guide, which represent graduated standard sizes of photographic film,
- a series of pin apertures in said table along said center line, each spaced from said edge guide a distance equal to the length of one of said rectangular areas, less twice the distance from said edge guide to the axis of said punch, and
- pins slidably engageable in said sockets.

2. The structure of Claim 1 and including means for drawing a film against the surface of said table.

3. An edge punching device for edge punching rectangular sheets of flexible film, the device including:
- a table,
- an edge guide extending upwardly from said table and adapted to engage an edge of the rectangular film sheet,
- a punch supported on a vertical axis in inwardly spaced relation to said edge guide,
- a series of guide lines on said table which are symmetrical on either side of a center line extending through the punch axis and extending at right angles to said edge guide,
- said guide lines outlining rectangular areas, one side of which extends along said edge guide, which represent graduated standard sizes of photographic film,
- a series of pin apertures in said table along said center line, each spaced from said edge guide a distance equal to the length of one of said rectangular areas, less twice the distance from said edge guide to the axis of said punch,
- pins slidably engageable in said apertures,
- a vacuum chamber beneath the top of said table outlining each area defined by said guide lines, the top of said table including apertures communicating with each vacuum chamber, and
- means selectively connecting a source of partial vacuum to each said vacuum chamber whereby a film of any of said standard sizes may be held firmly against said table top.